S. D. HARTOG.
PISTON RING.
APPLICATION FILED FEB. 14, 1919.
1,337,651. Patented Apr. 20, 1920.
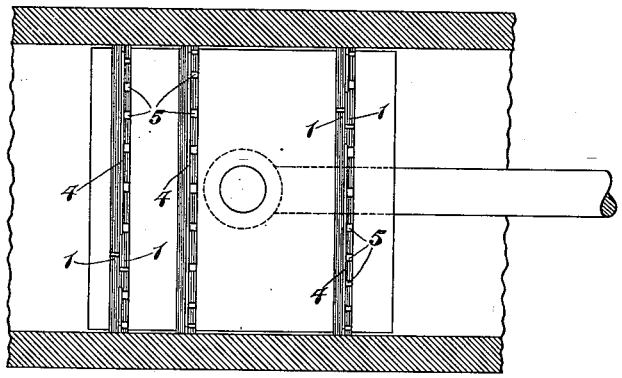
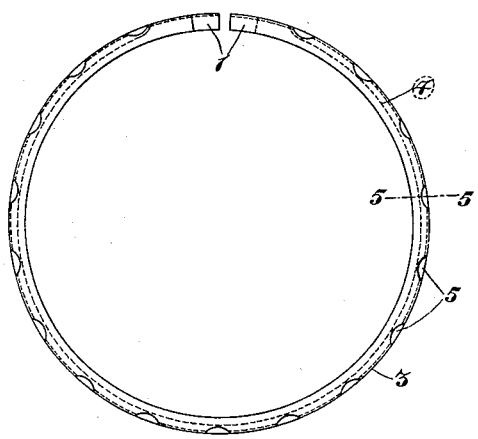
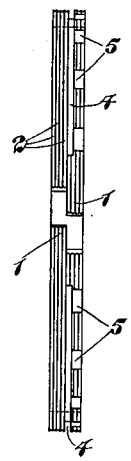
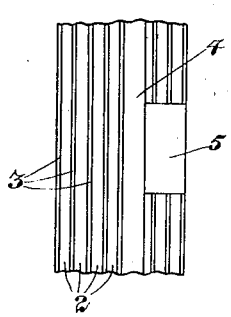
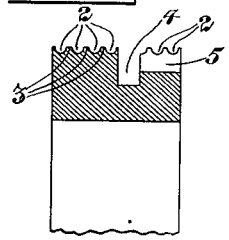
Attest:
Charles A. Becker.
Inventor.
Stephen D. Hartog.
By Rippey & Kingsland,
His Attorneys.

UNITED STATES PATENT OFFICE.

STEPHEN D. HARTOG, OF ST. LOUIS, MISSOURI, ASSIGNOR TO S. D. HARTOG MANUFACTURING COMPANY, OF ST. LOUIS, MISSOURI, A CORPORATION.

PISTON-RING.

1,337,651.　　　　Specification of Letters Patent.　　Patented Apr. 20, 1920.

Application filed February 14, 1919. Serial No. 276,955.

*To all whom it may concern:*

Be it known that I, STEPHEN D. HARTOG, a citizen of the United States, residing at the city of St. Louis and State of Missouri, have invented a new and useful Piston-Ring, of which the following is a specification.

This invention relates to piston rings.

An object of the invention is to provide a piston ring of the open resilient type having a number of circumferential scores or grooves adapted to contain a lubricant whereby a more perfect seal is formed with the cylinder wall.

Another object of the invention is to provide a piston ring having a relatively deep circumferential groove extending throughout nearly the entire circumference of the ring but terminating a short distance from each end of the ring, said groove being adapted to contain a considerable quantity of lubricant to form a more perfect seal with the cylinder wall.

Another object of the invention is to provide a piston ring of the character mentioned having numerous notches or passages extending from the deep groove to one of the side edges of the ring in order to admit lubricant into the groove continuously during the operation of the piston; whereby lubricant is continuously supplied to the groove.

Another object of the invention is to provide an individually cast piston ring having novel lubricant containing receptacles in the periphery thereof in order to form a more perfect seal with the wall of the cylinder.

Other objects will appear from the following description in which reference is made to the drawing illustrating a preferred embodiment of the invention, and in which—

Figure 1 is a view illustrating a piston equipped with my improved piston rings.

Fig. 2 is a side elevation of the ring showing particularly the lubricant admission passages by which lubricant is admitted into the lubricant containing groove.

Fig. 3 is a view looking toward the circumference of the ring showing the arrangement and construction of the circumferential grooves and scores.

Fig. 4 is an enlarged view of a portion of the periphery of the ring.

Fig. 5 is an enlarged sectional view on the line 5—5 of Fig. 2.

In the embodiment shown the ring is an individually cast annulus which, after casting, has its side edges ground to form smooth parallel side walls of the ring. The ring is then split to form a split ring capable of expansion and contraction and the ends thereof may be, and preferably are notched to form ends 1 which will overlap when the ring is compressed within the cylinder for which it is intended.

In the periphery of the ring numerous comparatively shallow circumferential grooves 2 are formed which, as shown, may extend entirely around the ring. The grooves 2 are separated by ribs 3 extending circumferentially around the ring and adapted to bear against the cylinder wall during the operation of the piston. The various grooves and scores 2 are designed and adapted to receive and retain lubricant during the operation of the piston in order to form a close seal with the cylinder wall.

In addition to the grooves 2 the ring is provided with a relatively large and deep groove 4 extending continuously throughout the circumference of the ring except for a short distance at each end thereof. By reference to Fig. 3 it will be observed that the groove 4 does not extend entirely to the ends of the ring, but that a short space is left between the ends of the groove 4 and the ends of the ring, which, however, may contain the shallow grooves 2.

The groove 4 is connected to one of the side edges of the ring by numerous indentations or notches 5 which form openings or inlet passages for the admission of oil into the groove 4. The groove 4 is thus connected with the lower edge of the ring by numerous passages which continuously during operation of the piston admit lubricant to the groove 4.

It is apparent that the grooves 2 and 4 and the notches 5 may be formed in the ring either before or after the ring is split and that the order of the performance of the various steps is immaterial.

The rings are mounted on the piston substantially as shown in Fig. 1 in which the indentations 5 are at the lower edges of the rings. Thus lubricant will be continuously supplied to the groove 4 and will also enter the grooves 2 and may pass therefrom into the space between the ends of the ring, thus forming a very close seal to prevent the passage or escape of gas or steam.

I do not restrict myself to unessential features, but what I claim and desire to secure by Letters Patent, is:—

1. A split piston ring having a relatively deep groove extending from a point near one end thereof to a point near the opposite end thereof, and having a relatively shallow circumferential groove between said deep groove and one of the side edges of the ring, and having a series of notches of greater depth than said shallow groove and of less depth than said deep groove connecting said deep groove with one of the side edges of the ring and intersecting said shallow groove.

2. A split piston ring having a relatively deep groove extending from a point near one end thereof to a point near the opposite end thereof, and a plurality of relatively shallow circumferential grooves extending continuously from end to end of the ring and having a series of notches of less depth than said deep groove and of greater depth than said shallow grooves intersecting said shallow grooves and connecting said deep groove with one of the side edges of the ring.

3. A split piston ring having a relatively deep groove extending from a point near one end thereof to a point near the opposite end thereof, and having a plurality of relatively shallow circumferential grooves extending continuously from end to end of the ring out of communication with said deep groove, and having another relatively shallow groove extending continuously from end to end of the ring, and passages connecting said last-named shallow groove with said deep groove.

STEPHEN D. HARTOG